US007445762B2

(12) United States Patent
Fife

(10) Patent No.: US 7,445,762 B2
(45) Date of Patent: Nov. 4, 2008

(54) METHOD TO PARTIALLY REDUCE CALCINED NIOBIUM METAL OXIDE AND OXYGEN REDUCED NIOBIUM OXIDES

(75) Inventor: James A. Fife, Myrtle Beach, SC (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 10/436,448

(22) Filed: May 12, 2003

(65) Prior Publication Data

US 2004/0033183 A1 Feb. 19, 2004

Related U.S. Application Data

(60) Continuation of application No. 10/150,568, filed on May 17, 2002, now Pat. No. 6,592,740, which is a division of application No. 09/347,990, filed on Jul. 6, 1999, now Pat. No. 6,416,730, which is a continuation-in-part of application No. 09/154,452, filed on Sep. 16, 1998, now Pat. No. 6,391,275.

(60) Provisional application No. 60/100,629, filed on Sep. 19, 1998.

(51) Int. Cl.
*C01G 1/02* (2006.01)
(52) U.S. Cl. ................................. 423/594.17
(58) Field of Classification Search ............ 423/594.17
See application file for complete search history.

(56) References Cited

U.S. PATENT DOCUMENTS

| | | | |
|---|---|---|---|
| 1,415,516 A | 5/1922 | Bridge | |
| 1,906,184 A | 4/1933 | Bohn | |
| 2,183,517 A | 12/1939 | Leemans et al. ............... 75/135 |
| 2,242,759 A | 5/1941 | Schlecht et al. ................ 75/84 |
| 2,443,254 A | 6/1948 | Kroll et al. ..................... 423/62 |
| 2,621,137 A | 12/1952 | Miller ........................ 148/13.1 |
| 2,700,606 A | 1/1955 | Wilhelm et al. ................ 75/84 |
| 2,761,776 A | 9/1956 | Bichowsky ........................ 75/5 |
| 2,861,882 A | 11/1958 | Bichowsky ...................... 75/84 |
| 2,937,939 A | 5/1960 | Wilhelm et al. ................ 75/84 |
| 2,992,095 A | 7/1961 | Li ................................. 75/27 |
| 3,133,788 A * | 5/1964 | Kern et al. ............. 423/594.17 |
| 3,421,195 A | 1/1969 | Berryhill .................... 29/25.42 |
| 3,647,420 A | 3/1972 | Restelli ........................ 75/84 |
| 3,665,260 A | 5/1972 | Kirkpatrick et al. .......... 361/529 |
| 3,849,124 A | 11/1974 | Villani ........................ 420/422 |
| 3,926,832 A | 12/1975 | Barosi ..................... 252/181.6 |
| 3,962,715 A | 6/1976 | Raccah et al. .................... 357/2 |
| 4,032,328 A | 6/1977 | Hurd ........................... 75/84.1 |
| 4,059,442 A | 11/1977 | Bernard ..................... 75/208 R |
| 4,118,727 A | 10/1978 | Laplante ....................... 357/10 |
| 4,126,493 A | 11/1978 | Wurm .......................... 148/20 |
| 4,186,423 A | 1/1980 | Yoshida et al. ............... 361/525 |
| 4,201,798 A | 5/1980 | Lindmayer .................... 427/74 |
| 4,406,699 A | 9/1983 | Beck et al. ..................... 75/233 |
| 4,428,856 A | 1/1984 | Boyarina et al. .......... 252/181.1 |
| 4,483,819 A | 11/1984 | Albrecht et al. ................ 419/2 |
| 4,668,501 A | 5/1987 | Shibuta et al. ............... 423/609 |
| 4,722,756 A | 2/1988 | Hard ........................ 148/126.1 |
| 4,748,737 A | 6/1988 | Charles et al. ................. 29/599 |
| 4,805,074 A | 2/1989 | Harakawa et al. ............ 361/525 |
| 4,923,531 A | 5/1990 | Fisher ...................... 148/126.1 |
| 4,960,471 A | 10/1990 | Fife ........................... 148/20.3 |
| 4,964,906 A | 10/1990 | Fife ............................. 75/369 |
| 5,011,742 A | 4/1991 | Fife et al. .................... 428/558 |
| 5,013,357 A | 5/1991 | Worcester et al. ............. 75/622 |
| 5,022,935 A | 6/1991 | Fisher ...................... 148/126.1 |
| 5,032,377 A | 7/1991 | Rademachers et al. ....... 423/607 |
| 5,171,379 A | 12/1992 | Kumar et al. ................ 148/422 |
| 5,211,741 A | 5/1993 | Fife ............................. 75/255 |
| 5,245,514 A | 9/1993 | Fife et al. .................... 361/529 |
| 5,281,496 A | 1/1994 | Clarke ........................ 423/609 |
| 5,320,782 A | 6/1994 | Okuda et al. ................. 423/609 |
| 5,369,547 A | 11/1994 | Evans ......................... 361/516 |
| 5,412,533 A | 5/1995 | Murayama et al. .......... 361/528 |
| 5,448,447 A | 9/1995 | Chang ........................ 361/529 |
| 5,470,525 A | 11/1995 | Tripp et al. .................... 419/36 |
| 5,688,730 A | 11/1997 | Bachelard et al. .......... 501/96.1 |
| 5,825,611 A | 10/1998 | Pozdeev ...................... 361/524 |
| 5,993,513 A | 11/1999 | Fife ............................. 75/743 |
| 6,007,597 A | 12/1999 | Puopolo et al. ............. 75/10.14 |

(Continued)

FOREIGN PATENT DOCUMENTS

AU 104631 8/1937

(Continued)

OTHER PUBLICATIONS

R. P. Elliott, Trans. Am. Soc. Metals, 52, 1960, no month, pp. 990-1014.*

(Continued)

*Primary Examiner*—Steven Bos

(57) ABSTRACT

Methods to at least partially reduce a niobium oxide are described wherein the process includes heat treating the niobium oxide in the presence of a getter material and in an atmosphere which permits the transfer of oxygen atoms from the niobium oxide to the getter material, and for a sufficient time and at a sufficient temperature to form an oxygen reduced niobium oxide. Niobium oxides and/or suboxides are also described as well as capacitors containing anodes made from the niobium oxides and suboxides.

20 Claims, 11 Drawing Sheets

U.S. PATENT DOCUMENTS

| | | | | |
|---|---|---|---|---|
| 6,051,044 | A | 4/2000 | Fife | 75/229 |
| 6,051,326 | A | 4/2000 | Fife | 428/610 |
| 6,136,062 | A | 10/2000 | Loffelholz et al. | 75/369 |
| 6,312,642 | B1 | 11/2001 | Fife | 419/30 |
| 6,322,912 | B1 | 11/2001 | Fife | 428/702 |
| 6,373,685 | B1 | 4/2002 | Kimmel et al. | 361/508 |
| 6,391,275 | B1 | 5/2002 | Fife | 423/592 |
| 6,416,730 | B1 | 7/2002 | Fife | 423/592 |
| 6,462,934 | B2 | 10/2002 | Kimmel et al. | 361/508 |
| 6,527,937 | B2 | 3/2003 | Fife | 205/209 |
| 6,576,099 | B2 | 6/2003 | Kimmel et al. | 204/291 |
| 2002/0028175 | A1 | 3/2002 | Fife | 423/592 |
| 2002/0114722 | A1 | 8/2002 | Kimmel et al. | 419/45 |
| 2002/0135973 | A1 | 9/2002 | Kimmel et al. | 361/509 |
| 2003/0104923 | A1 | 6/2003 | Omori et al. | 501/134 |
| 2003/0170169 | A1 | 9/2003 | Omori et al. | 423/592.1 |

FOREIGN PATENT DOCUMENTS

| | | |
|---|---|---|
| DE | 198 312 80 | 1/2000 |
| EP | 0 634 761 A | 1/1995 |
| EP | 1 144 147 A1 | 10/2001 |
| GB | 485318 | 5/1938 |
| GB | 489742 | 8/1938 |
| GB | 835316 | 5/1960 |
| GB | 1123015 | 8/1968 |
| WO | WO 98/19811 | 5/1998 |
| WO | WO 00/15556 | 9/1999 |
| WO | WO 00/15555 | 3/2000 |
| WO | WO 01/35428 A1 | 5/2001 |
| WO | WO 01/71738 A2 | 9/2001 |
| WO | WO 01/99130 A1 | 12/2001 |

OTHER PUBLICATIONS

Abstract Document No. 129:284714, 1998, no month.
Abstract Document No. 129:130191, 1998, no month.
Abstract Document No. 128:288971, 1998, no month.
Abstract Document No. 85:170443, 1976, no month.
Abstract Document No. 83:140466, 1975, no month.
Abstract Document No. 104:229152, 1986, no month.
Abstract Document No. 104:198128, 1986, no month.
Abstract Document No. 108:122980, 1988, no month.
Abstract Document No. 106:42412, 1987, no month.
Abstract Document No. 110:224093, 1989, no month.
Abstract Document No. 109:103212, 1988, no month.
Abstract Document No. 116:199338, 1992, no month.
Abstract Document No. 113:10823, 1990, no month.
Abstract Document No. 120:179957, 1994, no month.
Abstract Document No. 119:84165, 1993, no month.
Abstract Document No. 118:86049, 1993, no month.
Mellor "Inorganic and Theoretical Chemistry" vol. IX, pp. 856-857, no date.
Pages 59, 65, and 66 of Encyclopedia of Chemical Technology, vol. 17, 4th Edition, no date.
Young article, pp. 4 and 5 of Chapter 2, no date, no citation.
Vest et al., "Electrical Conductivity in Ceramics and Glass" Department of the Air Force, Aerospace Research Laboratories Wright-Patterson Air Forces Base, Ohio. pp. 375-384. (1974).
Freschotte, et al., "Niobium Physico-Chemical Properties of TTS Compounds and Alloys" Atomic Energy Review, Special Issue No. 2. International Atomic Energy Agency—Vienna (1968). pp. 57-59.
Kuz' micheva, et al., "Superconductivity in lathanide-strontium-niobium-oxide systems" Sh. Neorg. Khim. 38(1), 162-6. (1993).
Acrivos, et al., "Dynamic phenomena in superconducting oxides measured by ESR" Phys. Rev. B: Condens. Matter, 50(18), pp. 12710-12723. (1994).
Acrivos, et al., "Dynamics of flux motion . . . " Physica C (Amsterdam) 234-40(Pt. 5), pp. 3159-3160. (1994).
International Search Report for PCT/US99/21413 mailed Sep. 16, 1999.
Georg Bauer, "The Oxides of Niobium," Zeitschrift fuer anorganische und allgemeine Chemie, vol. 248, Sep. 12, 1941, No. 1, pp. 1-31. (With Full English Translation).
J. W. Mellor, A Comprehensive Treatise on Inorganic and Theoretical Chemistry, Sep. 1947, vol. IX, p. 856.
"Niobium and Oxygen" Gmelins Handbook of Inorganic Chemistry, Verlag Chemi, 1970, pp. 14-44 (with English Translation).
Hiraoka et al., "Electrochemical Measurement of the Standard Free Energies of Formation of Niobium Oxides," Transactions ISU, vol. 11, pp. 102-106 (1971).
Baba et al., "Preparation and Chlorination of $NbO_2$, NbO and NbC," Journal Mining and Mettallurgical Institute of Japan, vol. 82, No. 942, pp. 855-860 (1966).
Steeb, et al., "NIOB und Sauerstoff," Gmelin, Niob, Part B1, vol. 49, pp. 26-33 (1970) w/ partial English trans.
Mudrolyubov, "Production of trantalum capacitors in the C.I.S, " Philadelphia meeting of the TIC, pp. 3-4 (1991).
Andersson, "Die Bedeuting des Tantals in der Kondensatorindustrie," Erzmetall, vol. 48, No. 6/7, pp. 430-434 (1995).
Brauer et al., "Die Nitride des Niobs," Z. anorg. Allg. Chemie, vol. 270, pp. 160-178 (1952) w/ partial Engl. Trans.
Brauer, "Nitrides, Carbonitrides and Oxynitrides of Niobium," Journal of the less-Common Metals, vol. 2, pp. 131-137, (1960).
Schonberg, "Some Features of the Nb-N and Nb-N-O Systems," ACTA Chem. Scand., vol. 8, pp. 208-212 (1954).
Bauer, "The Oxides of Niobium," Zeitschrift fuer anorganische und allgemeine Chemie, vol. 248, No. 1, pp. 15-45 (1941) (English translation).
Gannon et al., "The Microstructure of Slighly Substoichiometric $NbO_2$," Journal of Solid State Chemistry, vol. 20, pp. 331-344 (1977).
Schafer, "Uber die Darstellung der Nioboxide und ihren Transport im Temperaturgefalle," Z. anorg. Allg. Chemie. vol. 317, pp. 321-333, (1962) w/ partial English translation.
Mifune, et al., "Niobium Solid Electrolytic Capacitors," National Technical Report 1, 147, pp. 1-14, (1963).
Lapitskii, et al., "The Formation of the lower oxides of niobium and tantalum in some reactions of reduction and oxidation," Zhurnal Neorganicheskoi Khimii, vol. II, No. 1, pp. 80-91, (1957).
Orlov et al., "Study of Oxygen Solubility in Niobium," Metally, No. 5, pp. 202-205 (1985).
Brauer et al., "Mikrokristallines NbO," p. 1462, from Handbuch der Präparativen Anorganischen Chemie w/ partial English translation.
Mellor, J.W., "A Comprehensive Treatise on Inorganic and Theoretical Chemistry," vol. IX, pp. 895-896, 1947.
Notice of Opposition for EP 1115658 B1 with English Translation filed Apr. 2, 2004 by H.C. Stark GmbH.
Notice of Opposition for EP 1115658 B1 in English filed Apr. 8, 2004 by Strawman Limited.
Summons to attend oral proceedings pursuant to Rule 71(1) EPC issued by the European Patent Office in European Patent No. 1 115 658 dated Dec. 14, 2006.
Letter to European Patent Office dated Apr. 7, 2005 in European Patent No. 1 115 658 in response to the Communication dated Jul. 28, 2004 and to the Notices of Opposition filed by H.C. Starck GmbH & Co. KG (Opponent 01) and Strawman Ltd. (Opponent 02) with attachments.
Brief Communication from European Patent Office in European Patent No. 1 115 658 dated Nov. 17, 2005 with Letter from Opponent 01 dated Nov. 8, 2005 (in German), with full English translation.
Communication of notices of opposition (R. 57(1) EPC) from European Patent Office in counterpart European Patent No. 1 115 658 dated Jul. 28, 2004.
Brauer, "Niobium (II) Oxide," Handbook of Preparative Inorganic Chemistry, vol. 2, 2nd Edition, 1965 (3 pages).
Mitune et al., "Niobium Solid Electrolytic Capacitors," National Technical Report 9, 147 (1963) (14 pages).
Brief Communication from European Patent Office in European Patent No. 1 115 658 dated Jun. 25, 2004.

Orlov et al., "Study of Oxygen Solubility in Niobium," (transcribed from original pp. 200-202), Izvestiya Akademii Nauk SSSR, Metally, No. 5, pp. 202-205, 1985 (5 pages).

Pozdeev-Freeman, "Niobium Capacitors: From Raw Materials to Finished Parts," Carts Europe 2002: 16$^{TH}$ Passive Components Symposium, Oct. 14-17, 2002, pp. 19-25.

Renumeration of the prior art documents cited by Opponents 1 and 2 in European Patent No. 1 115 658, Annex 1 (1 page), no date.

Kubaechewski, "Uber Die Reduktion Des 2-Niob-5-Oxydes Bis Zum 2-Niob-1-Oxyd Mit Wasserstoff," Ztechr. Elektrochem, Bd. 46, Nr. 4, 1940, pp. 284-287.

Holleman-Wiberg, *"Lehrbuch der Anorganischen Chemie,"* Walter de Gruyter, 91-100, 1985, pp. 1076-1077.

EPO Communication for European Patent Application No. 03 014 767.2-2113, dated Nov. 23, 2007, 5 pages.

* cited by examiner

METHOD TO PARTIALLY REDUCE CALCINED NIOBIUM METAL OXIDE AND OXYGEN REDUCED NIOBIUM OXIDES

This application is a continuation application of U.S. patent application Ser. No. 10/150,568 filed May 17, 2002, now U.S. Pat. No. 6,592,740 B2, which is a divisional application of U.S. patent application Ser. No. 09/347,990 filed Jul. 6, 1999, now U.S. Pat. No. 6,416,730 B1, which is a continuation-in-part of U.S. patent application Ser. No. 09/154,452 filed Sep. 16, 1998, now U.S. Pat. No. 6,391,275 B1, and U.S. Patent Application No. 60/100,629 filed Sep. 16, 1998, which are both incorporated herein in their entirety by reference.

BACKGROUND OF THE INVENTION

The present invention relates to niobium and oxides thereof and more particularly relates to niobium oxides and methods to at least partially reduce niobium oxide and further relates to oxygen reduced niobium.

SUMMARY OF THE PRESENT INVENTION

In accordance with the purposes of the present invention, as embodied and described herein, the present invention relates to a method to at least partially reduce a niobium oxide which includes the steps of heat treating the niobium oxide in the presence of a getter material and in an atmosphere which permits the transfer of oxygen atoms from the niobium oxide to the getter material for a sufficient time and temperature to form an oxygen reduced niobium oxide.

The present invention also relates to oxygen reduced niobium oxides which preferably have beneficial properties, especially when formed into an electrolytic capacitor anode. For instance, a capacitor made from the oxygen reduced niobium oxide of the present invention can have a capacitance of up to about 200,000 CV/g or more. Further, electrolytic capacitor anodes made from the oxygen reduced niobium oxides of the present invention can have a low DC leakage. For instance, such a capacitor can have a DC leakage of from about 0.5 nA/CV to about 5.0 nA/CV.

Accordingly, the present invention also relates to methods to increase capacitance and reduce DC leakage in capacitors made from niobium oxides, which involves partially reducing a niobium oxide by heat treating the niobium oxide in the presence of a getter material and in an atmosphere which permits the transfer of oxygen atoms from the niobium oxide to the getter material, for a sufficient time and temperature to form an oxygen reduced niobium oxide, which when formed into a capacitor anode, has reduced DC leakage and/or increased capacitance.

It is to be understood that both the foregoing general description and the following detailed description are exemplary and explanatory only and are intended to provide further explanation of the present invention, as claimed.

DETAILED DESCRIPTION OF THE PRESENT INVENTION

Figure 1:
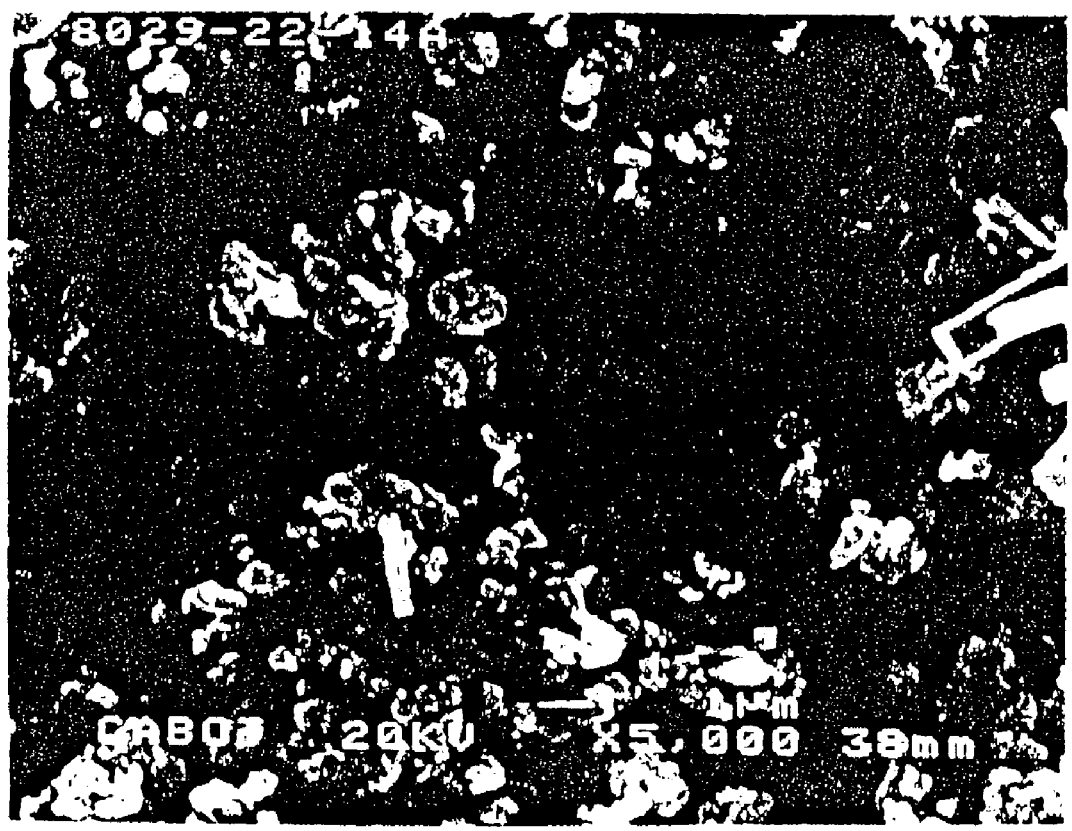
FIGS. 1-11 are SEMs of various oxygen reduced niobium oxides of the present invention at various magnifications.

In an embodiment of the present invention, the present invention relates to methods to at least partially reduce a niobium oxide. In general, the method includes the steps of heat treating a starting niobium oxide in the presence of a getter material in an atmosphere which permits the transfer of oxygen atoms from the niobium oxide to the getter material for a sufficient time and at a sufficient temperature to form an oxygen reduced niobium oxide.

For purposes of the present invention, the niobium oxide can be at least one oxide of niobium metal and/or alloys thereof. A specific example of a starting niobium oxide is $Nb_2O_5$.

The niobium oxide used in the present invention can be in any shape or size. Preferably, the niobium oxide is in the form of a powder or a plurality of particles. Examples of the type of powder that can be used include, but are not limited to, flaked, angular, nodular, and mixtures or variations thereof. Preferably, the niobium oxide is in the form of a powder which more effectively leads to the oxygen reduced niobium oxide.

Examples of such preferred niobium oxide powders include those having mesh sizes of from about 60/100 to about 100/325 mesh and from about 60/100 to about 200/325 mesh. Another range of size is from −40 mesh to about −325 mesh. In other words, the preferred niobium oxide powders have particle sizes from about 150/250 to about 45/150 microns, and from about 150/250 to about 45/75 microns. Another preferred size range is from about 355 microns to about 45 microns.

The getter material for purposes of the present invention is any material capable of reducing the specific starting niobium oxide to the oxygen reduced niobium oxide. Preferably, the getter material comprises tantalum, niobium, or both. Other examples include, but are not limited to, magnesium and the like. Any getter material that has a greater affinity for oxygen than niobium oxide can be used. More preferably, the getter material is niobium. The niobium getter material for purposes of the present invention is any material containing niobium metal which can remove or reduce at least partially the oxygen in the niobium oxide. Thus, the niobium getter material can be an alloy or a material containing mixtures of niobium metal with other ingredients. Preferably, the niobium getter material is predominantly, if not exclusively, niobium metal. The purity of the niobium getter material is not important but it is preferred that high purity niobium comprise the getter material to avoid the introduction of other impurities during the heat treating process. Accordingly, the niobium metal in the niobium getter material preferably has a purity of at least about 98% and more preferably at least about 99%. Oxygen levels in the niobium getter material can be any amount. Preferably, impurities that affect DC leakage, such as iron, nickel, chromium, and carbon, are below about 100 ppm. Most preferably, the getter material is a niobium flake metal preferably having a high capacitance capability, such as greater than about 75,000 Cv/g and more preferably about 100,000 Cv/g or higher, such as about 200,000 Cv/g. The getter material also preferably has a high surface area, such as a BET of from about 5 to about 30 $m^2/g$ and more preferably from about 20 to about 30 $m^2/g$.

The getter material can be in any shape or size. For instance, the getter material can be in the form of a tray which contains the niobium oxide to be reduced or can be in a particle or powder size. Preferably, the getter materials are in the form of a powder in order to have the most efficient surface area for reducing the niobium oxide. The getter material, thus, can be flaked, angular, nodular, and mixtures or variations thereof, e.g., coarse chips, such as 14/40 mesh chips that can be easily separated from the powder product by screening.

Similarly, the getter material can be tantalum and the like and can have the same preferred parameters and/or properties discussed above for the niobium getter material. Other getter materials can be used alone or in combination with the tantalum or niobium getter materials. Also, other materials can form a part of the getter material.

Generally, a sufficient amount of getter material is present to at least partially reduce the niobium oxide being heat treated. Further, the amount of the getter material is dependent upon the amount of reducing desired to the niobium oxide. For instance, if a slight reduction in the niobium oxide is desired, then the getter material will be present in a stoichemetric amount. Similarly, if the niobium oxide is to be reduced substantially with respect to its oxygen presence, then the getter material is present in a 2 to 5 times stoichemetric amount. Generally, the amount of getter material present (e.g., based on the tantalum getter material being 100% tantalum) can be present based on the following ratio of getter material to the amount of niobium oxide present of from about 2 to 1 to about 10 to 1. The getter material is preferably blended or mixed together with the starting niobium oxide in an atmosphere which permits the transfer of oxygen atoms from the niobium oxide to the getter material (e.g., a hydrogen atmosphere), and preferably at a temperature of from about 1100° C. to about 1500° C.

Furthermore, the amount of getter material can also be dependent on the type of niobium oxide being reduced. For instance, when the niobium oxide being reduced is $Nb_2O_5$, the amount of getter material is preferably 5 to 1. Also, when starting with $Nb_2O_5$, a stoichiometric amount of getter material, preferably niobium flake metal, is used to achieve an oxide which preferably is 0.89 parts metal to 1 part oxide.

The heat treating that the starting niobium oxide is subjected to can be conducted in any heat treatment device or furnace commonly used in the heat treatment of metals, such as niobium and tantalum. The heat treatment of the niobium oxide in the presence of the getter material is at a sufficient temperature and for a sufficient time to form an oxygen reduced niobium oxide. The temperature and time of the heat treatment can be dependent on a variety of factors such as the amount of reduction of the niobium oxide, the amount of the getter material, and the type of getter material as well as the type of starting niobium oxide. Generally, the heat treatment of the niobium oxide will be at a temperature of from less than or about 800° C. to about 1900° C. and more preferably from about 1000° C. to about 1400° C., and most preferably from about 1100° C. to about 1250° C. In more detail, when the niobium oxide is a niobium containing oxide, the heat treatment temperatures will be from about 1000° C. to about 1300° C., and more preferably from about 1100° C. to about 1250° C. for a time of from about 5 minutes to about 100 minutes, and more preferably from about 30 minutes to about 60 minutes. Routine testing in view of the present application will permit one skilled in the art to readily control the times and temperatures of the heat treatment in order to obtain the proper or desired reduction of the niobium oxide.

The heat treatment occurs in an atmosphere which permits the transfer of oxygen atoms from the niobium oxide to the getter material. The heat treatment preferably occurs in a hydrogen containing atmosphere which is preferably just hydrogen. Other gases can also be present with the hydrogen, such as inert gases, so long as the other gases do not react with the hydrogen. Preferably, the hydrogen atmosphere is present during the heat treatment at a pressure of from about 10 Torr to about 2000 Torr, and more preferably from about 100 Torr to about 1000 Torr, and most preferably from about 100 Torr to about 930 Torr. Mixtures of $H_2$ and an inert gas such as Ar can be used. Also, $H_2$ in $N_2$ can be used to effect control of the $N_2$ level of the niobium oxide.

During the heat treatment process, a constant heat treatment temperature can be used during the entire heat treating process or variations in temperature or temperature steps can be used. For instance, hydrogen can be initially admitted at 1000° C. followed by increasing the temperature to 1250° C. for 30 minutes followed by reducing the temperature to 1000° C. and held there until removal of the $H_2$ gas. After the $H_2$ or other atmosphere is removed, the furnace temperature can be dropped. Variations of these steps can be used to suit any preferences of the industry. The oxygen reduced niobium oxides can be subsequently reduced in size such as by crushing. The oxygen reduced niobium oxides can be agglomerated and crushed or processed in any other way that valve metals can be processed.

The oxygen reduced niobium oxides can also contain levels of nitrogen, e.g., from about 100 ppm to about 30,000 ppm $N_2$.

The oxygen reduced niobium oxide is any niobium oxide which has a lower oxygen content in the metal oxide compared to the starting niobium oxide. Typical reduced niobium oxides comprise NbO, $NbO_{0.7}$, $NbO_{1.1}$, $NbO_2$, and any combination thereof with or without other oxides present. Generally, the reduced niobium oxide of the present invention has an atomic ratio of niobium to oxygen of about 1 less than 2.5, and preferably 1:2 and more preferably 1:1.1, 1:1, or 1:0.7. Put another way, the reduced niobium oxide preferably has the formula $Nb_xO_y$, wherein Nb is niobium, x is 2 or less, and y is less than 2.5x. More preferably x is 1 and y is less than 2, such as 1.1, 1.0, 0.7, and the like.

The starting niobium oxides can be prepared by calcining at 1000° C. until removal of any volatile components. The oxides can be sized by screening. Preheat treatment of the niobium oxides can be used to create controlled porosity in the oxide particles.

The reduced niobium oxides of the present invention also preferably have a microporous surface and preferably have a sponge-like structure, wherein the primary particles are preferably 1 micron or less. The SEMs further depict the type of preferred reduced niobium oxide of the present invention. As can be seen in these microphotographs, the reduced niobium oxides of the present invention can have high specific surface area, and a porous structure with approximately 50% porosity. Further, the reduced niobium oxides of the present invention can be characterized as having a preferred specific surface area of from about 0.5 to about 10.0 $m^2/g$, more preferably from about 0.5 to 2.0 $m^2/g$, and even more preferably from about 1.0 to about 1.5 $m^2/g$. The preferred apparent density of the powder of the niobium oxides is less than about 2.0 g/cc, more preferably, less than 1.5 g/cc and even more preferably, from about 0.5 to about 1.5 g/cc. Also, the powder of the niobium oxides can have Scott densities, such as from about 5 $g/in^3$ to about 35 $g/in^3$.

The various oxygen reduced niobium oxides of the present invention can be further characterized by the electrical properties resulting from the formation of a capacitor anode using the oxygen reduced niobium oxides of the present invention. In general, the oxygen reduced niobium oxides of the present invention can be tested for electrical properties by pressing powders of the oxygen reduced niobium oxide into an anode and sintering the pressed powder at appropriate temperatures and then anodizing the anode to produce an electrolytic capacitor anode which can then be subsequently tested for electrical properties.

Accordingly, another embodiment of the present invention relates to anodes for capacitors formed from the oxygen reduced niobium oxides of the present invention. Anodes can be made from the powdered form of the reduced oxides in a similar process as used for fabricating metal anodes, i.e., pressing porous pellets with embedded lead wires or other connectors followed by optional sintering and anodizing. The lead connector can be embedded or attached at any time before anodizing. Anodes made from some of the oxygen reduced niobium oxides of the present invention can have a capacitance of from about 1,000 CV/g or lower to about 300,000 CV/g or more, and other ranges of capacitance can be from about 20,000 CV/g to about 300,000 CV/g or from about 62,000 CV/g to about 200,000 CV/g and preferably from about 60,000 to 150,000 CV/g. In forming the capacitor anodes of the present invention, a sintering temperature can be used which will permit the formation of a capacitor anode having the desired properties. The sintering temperature will be based on the oxygen reduced niobium oxide used. Preferably, the sintering temperature is from about 1200° C. to about 1750° C. and more preferably from about 1200° C. to about 1400° C. and most preferably from about 1250° C. to about 1350° C. when the oxygen reduced niobium oxide is an oxygen reduced niobium oxide.

The anodes formed from the niobium oxides of the present invention are preferably formed at a voltage of about 35 volts and preferably from about 6 to about 70 volts. When an oxygen reduced niobium oxide is used, preferably, the forming voltages are from about 6 to about 50 volts, and more preferably from about 10 to about 40 volts. Other high formation voltages can be used. Anodes of the reduced niobium oxides can be prepared by fabricating a pellet of $Nb_2O_5$ with a lead wire followed by sintering in $H_2$ atmosphere or other suitable atmosphere in the proximity of a getter material just as with powdered oxides. In this embodiment, the anode article produced can be produced directly, e.g., forming the oxygen reduced valve metal oxide and an anode at the same time. Also, the anodes formed from the oxygen reduced niobium oxides of the present invention preferably have a DC leakage of less than about 5.0 nA/CV. In an embodiment of the present invention, the anodes formed from some of the oxygen reduced niobium oxides of the present invention have a DC leakage of from about 5.0 nA/CV to about 0.50 nA/CV.

The present invention also relates to a capacitor in accordance with the present invention having a niobium oxide film on the surface of the capacitor. Preferably, the film is a niobium pentoxide film. The means of making metal powder into capacitor anodes is known to those skilled in the art and such methods such as those set forth in U.S. Pat. Nos. 4,805,074, 5,412,533, 5,211,741, and 5,245,514, and European Application Nos. 0 634 762 A1 and 0 634 761 A1, all of which are incorporated in their entirety herein by reference.

The capacitors of the present invention can be used in a variety of end uses such as automotive electronics, cellular phones, computers, such as monitors, mother boards, and the like, consumer electronics including TVs and CRTs, printers/copiers, power supplies, modems, computer notebooks, disc drives, and the like.

The present invention will be further clarified by the following examples, which are intended to be exemplary of the present invention.

TEST METHODS

Anode Fabrication:
  size—0.197" dia
  3.5 Dp
  powder wt=341 mg
Anode Sintering:
  1300 Deg C* 10'
  1450 Deg C* 10'
  1600 Deg C* 10'
  1750 Deg C* 10'
30V Ef Anodization:
  30V Ef @ 60 Deg C./0.1% $H_3PO_4$ Electrolyte
    20 mA/g constant current
  DC Leakage/Capacitance—FSR Testing:
  DC Leakage Testing—
    70% Ef (21 VDC) Test Voltage
    60 second charge time
    10% $H_3PO_4$ @ 21 Deg C.
  Capacitance—DF Testing:
    18% $H_2SO_4$ @ 21 Deg C.
    120 Hz
50V Ef Reform Anodization:
  50V Ef @ 60 Deg C./0.1% $H_3PO_4$ Electrolyte
    20 mA/g constant current
  DC Leakage/Capacitance—FSR Testing:
  DC leakage Testing—
    70% Ef (35 VDC) Test Voltage
    60 second charge time
    10% $H_3PO_4$ @ 21 Deg C.
  Capacitance—DF Testing:
    18% $H_2SO_4$ @ 21 Deg C.
    120 Hz
75V Ef Reform Anodization:
  75V Ef @ 60 Deg C./0.1% $H_3PO_4$ Electrolyte
    20 mA/g constant current
  DC Leakage/Capacitance—FSR Testing:
  DC leakage Testing—
    70% Ef (52.5 VDC) Test Voltage
    60 second charge time
    10% $H_3PO_4$ 169 21 Deg C.
  Capacitance—DF Testing:
    18% $H_2SO_4$ @ 21 Deg C.
    120 Hz Scott Density, oxygen analysis, phosphorus analysis, and BET analysis were determined according to the procedures set forth in U.S. Pat. Nos. 5,011,742; 4,960,471; and 4,964,906, all incorporated hereby in their entireties by reference herein.

EXAMPLES

Example 1

+10 mesh Ta hydride chips (99.2 gms) with approximately 50 ppm oxygen were mixed with 22 grams of $Nb_2O_5$ and placed into Ta trays. The trays were placed into a vacuum heat treatment furnace and heated to 1000° C. $H_2$ gas was admitted to the furnace to a pressure of +3 psi. The temperature was further ramped to 1240° C. and held for 30 minutes. The temperature was lowered to 1050° C. for 6 minutes until all $H_2$ was swept from the furnace. While still holding 1050° C., the argon gas was evacuated from the furnace until a pressure of $5 \times 10^{-4}$ torr was achieved. At this point 700 mm of argon was readmitted to the chamber and the furnace cooled to 60° C.

The material was passivated with several cyclic exposures to progressively higher partial pressures of oxygen prior to removal from the furnace as follows: The furnace was backfilled with argon to 700 mm followed by filling to one atmosphere with air. After 4 minutes the chamber was evacuated to $10^{-2}$ torr. The chamber was then backfilled to 600 mm with argon followed by air to one atmosphere and held for 4 minutes. The chamber was evacuated to $10^{-2}$ torr. The chamber was then backfilled to 400 mm argon followed by air to one atmosphere. After 4 minutes the chamber was evacuated to $10^{-2}$ torr. The chamber was them backfilled to 200 mm argon followed by air to one atmosphere and held for 4 minutes. The chamber was evacuated to $10^{-2}$ torr. The chamber was backfilled to one atmosphere with air and held for 4 minutes. The chamber was evacuated to $10^{-2}$ torr. The chamber was backfilled to one atmosphere with argon and opened to remove the sample. The powder product was separated from the tantalum chip getter by screening through a 40 mesh screen. The product was tested with the following results.

CV/g of pellets sintered to 1300° C. × 10
minutes and formed to 35
volts = 81,297
nA/CV (DC leakage) = 5.0
Sintered Density of pellets = 2.7 g/cc
Scott density = 0.9 g/cc
Chemical Analysis (ppm)
C = 70
$H_2$ = 56
Ti = 25        Fe = 25
Mn = 10        Si = 25
Sn = 5         Ni = 5
Cr = 10        Al = 5
Mo = 25        Mg = 5
Cu = 50        B = 2
Pb = 2         all others < limits Example 2

Samples 1 through 20 are examples following similar steps as above with powdered $Nb_2O_5$ as indicated in the Table. For most of the examples, mesh sizes of the starting input material are set forth in the Table, for example 60/100, means smaller than 60 mesh, but larger than 100 mesh. Similarly, the screen size of some of the Ta getter is given as 14/40. The getters marked as "Ta hydride chip" are +40 mesh with no upper limit on particle size.

Sample 18 used Nb as the getter material (commercially available N200 flaked Nb powder from CPM). The getter material for sample 18 was fine grained Nb powder which was not separated from the final product. X-ray diffraction showed that some of the getter material remained as Nb, but most was converted to $NbO_{1.1}$ and NbO by the process as was the starting niobium oxide material $Nb_2O_5$.

Sample 15 was a pellet of $Nb_2O_5$, pressed to near solid density, and reacted with $H_2$ in close proximity to the Ta getter material. The process converted the solid oxide pellet into a porous slug of NbO suboxide. This slug was sintered to a sheet of Nb metal to create an anode lead connection and anodized to 35 volts using similar electrical forming procedures as used for the powder slug pellets. This sample demonstrates the unique ability of this process to make a ready to anodize slug in a single step from $Nb_2O_5$ starting material.

Figure 2:
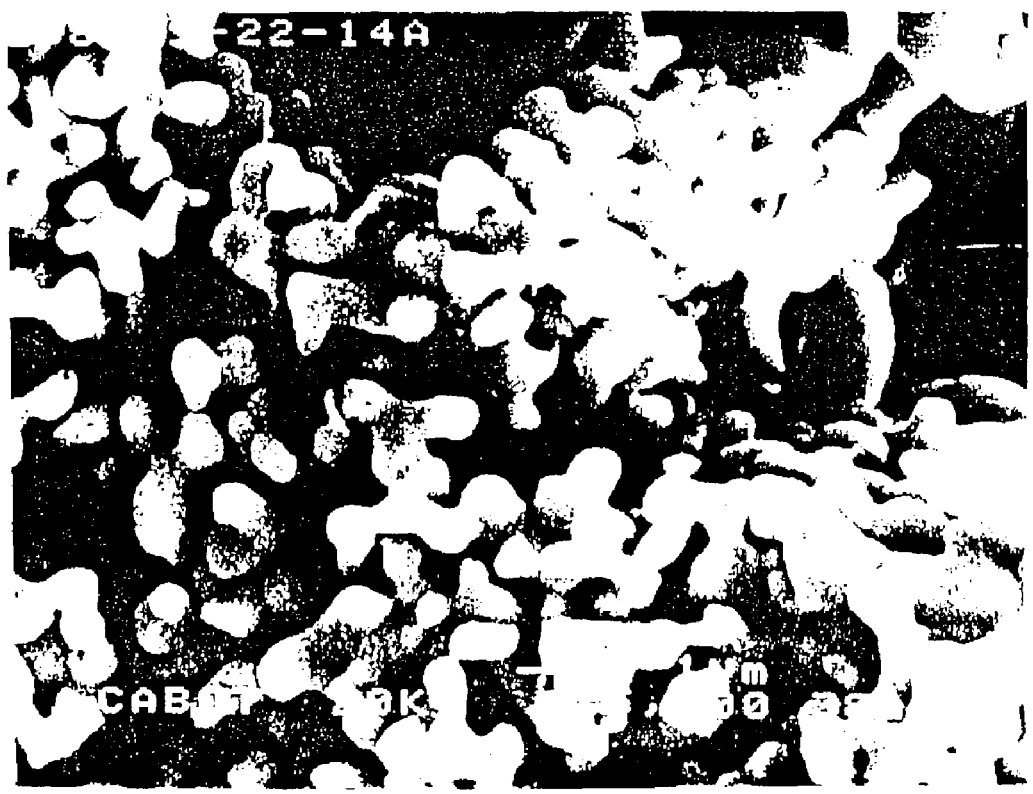
Figure 3:
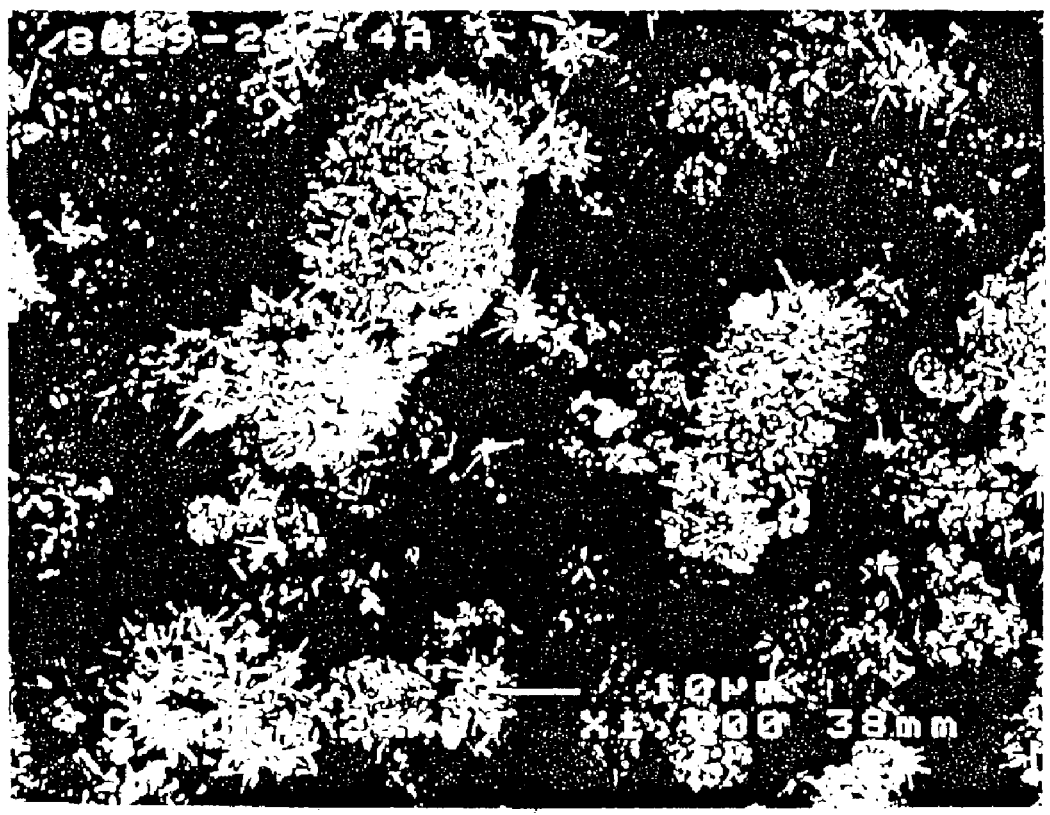
Figure 4:
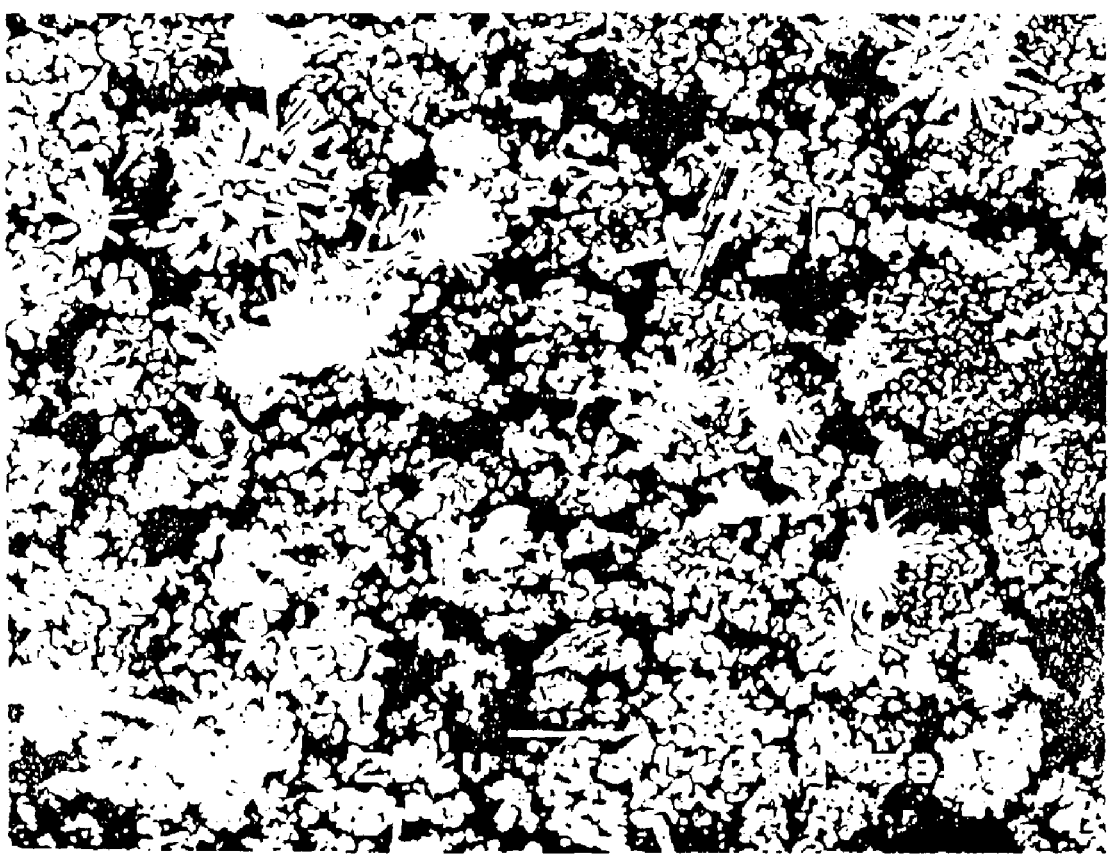
Figure 5:
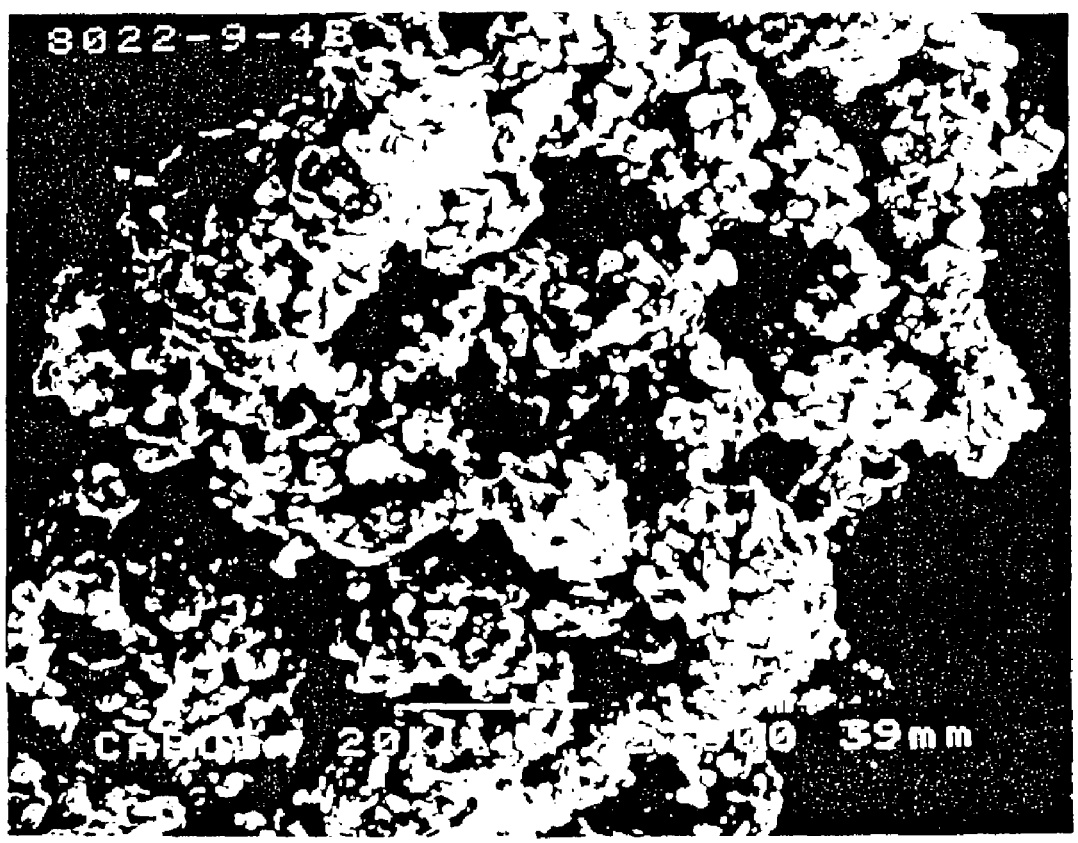
Figure 6:
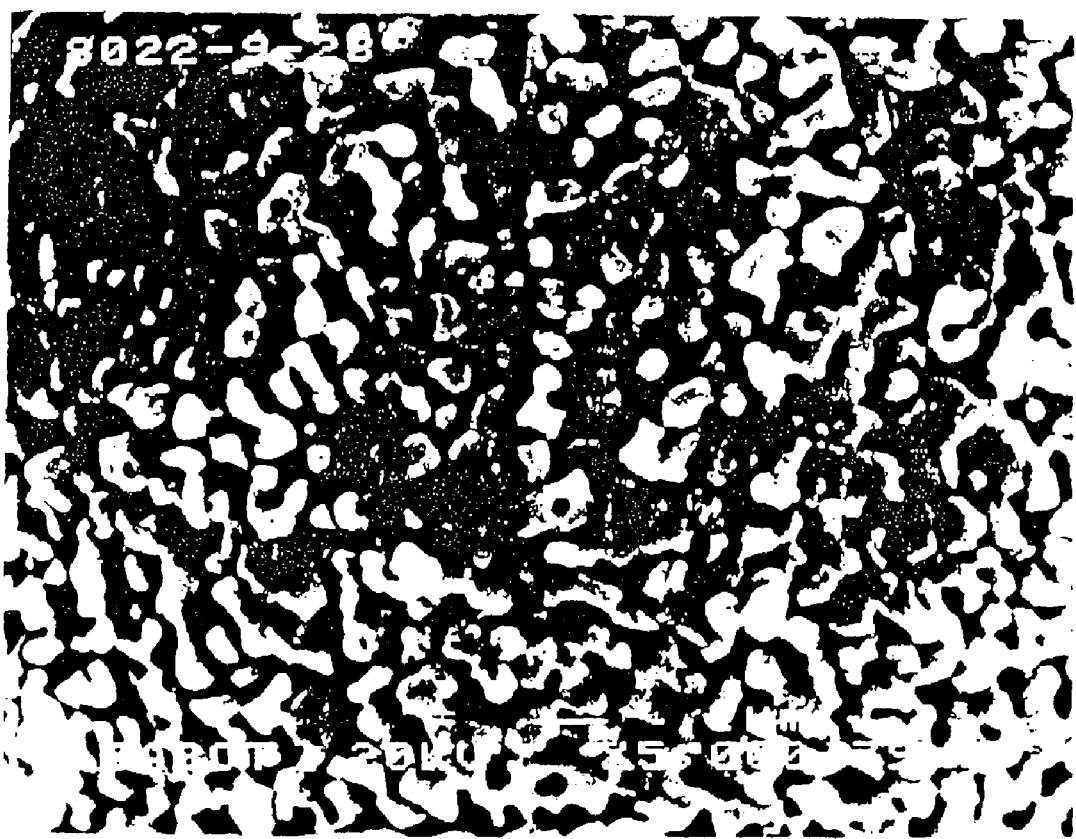
Figure 7:
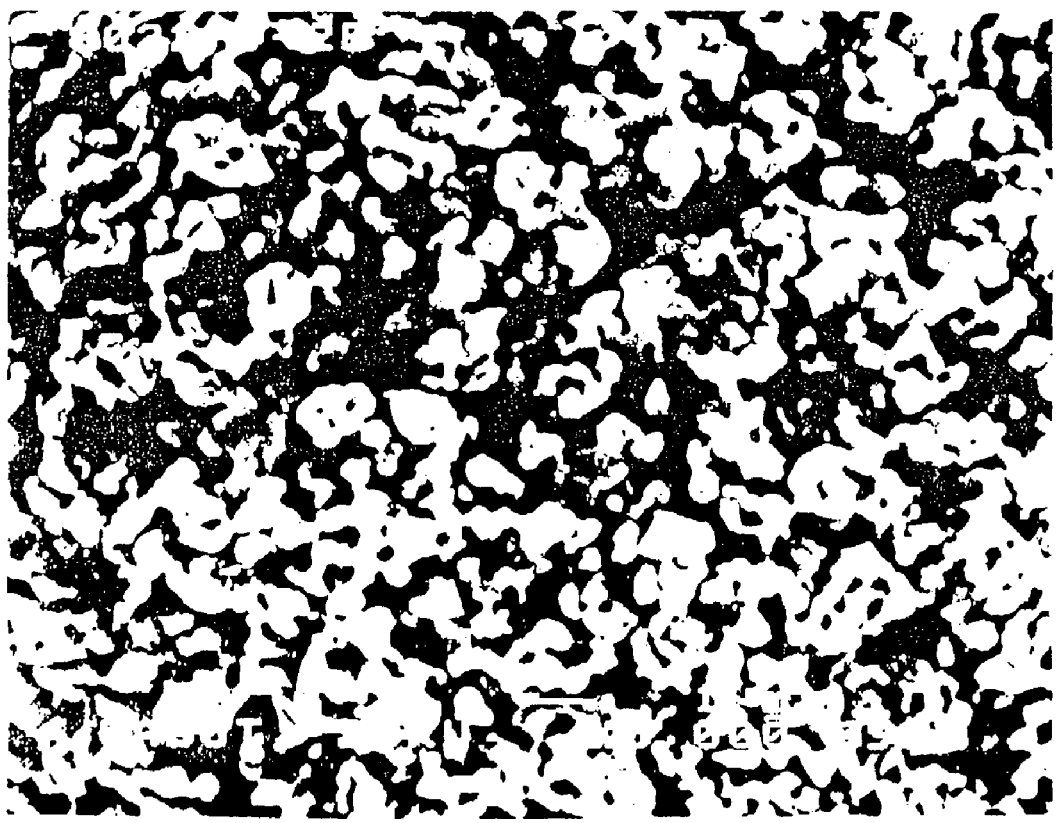
Figure 8:
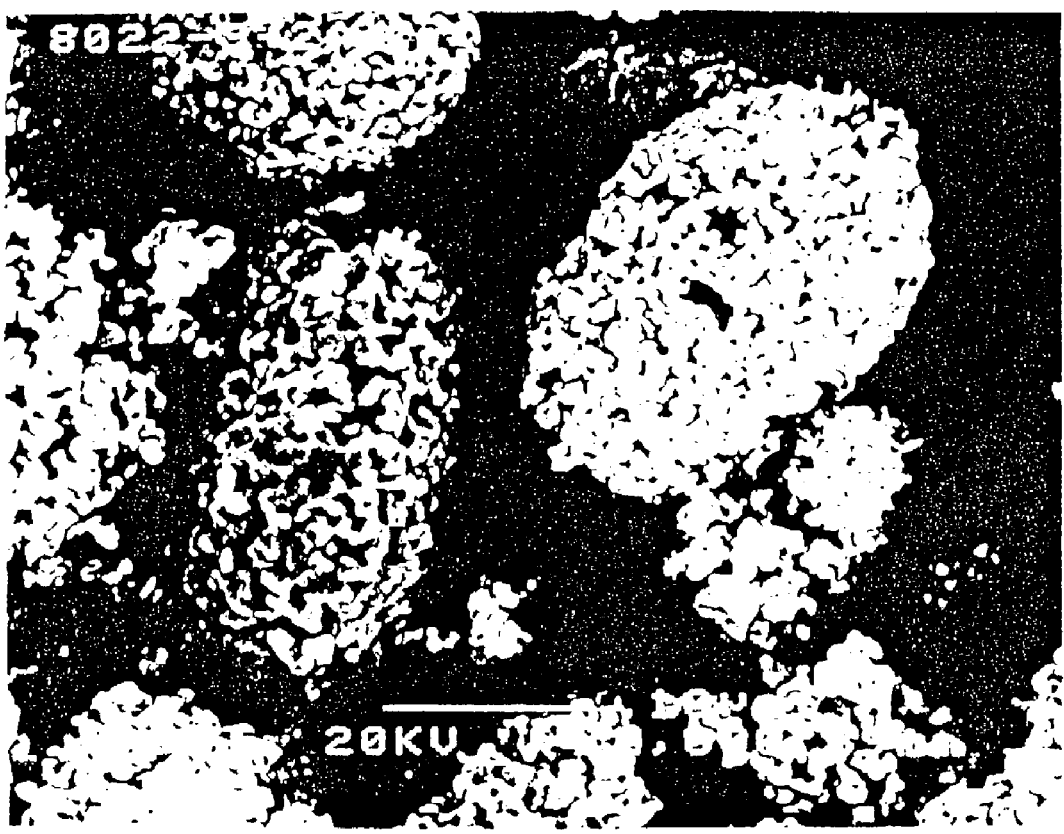
Figure 9:
Figure 10:
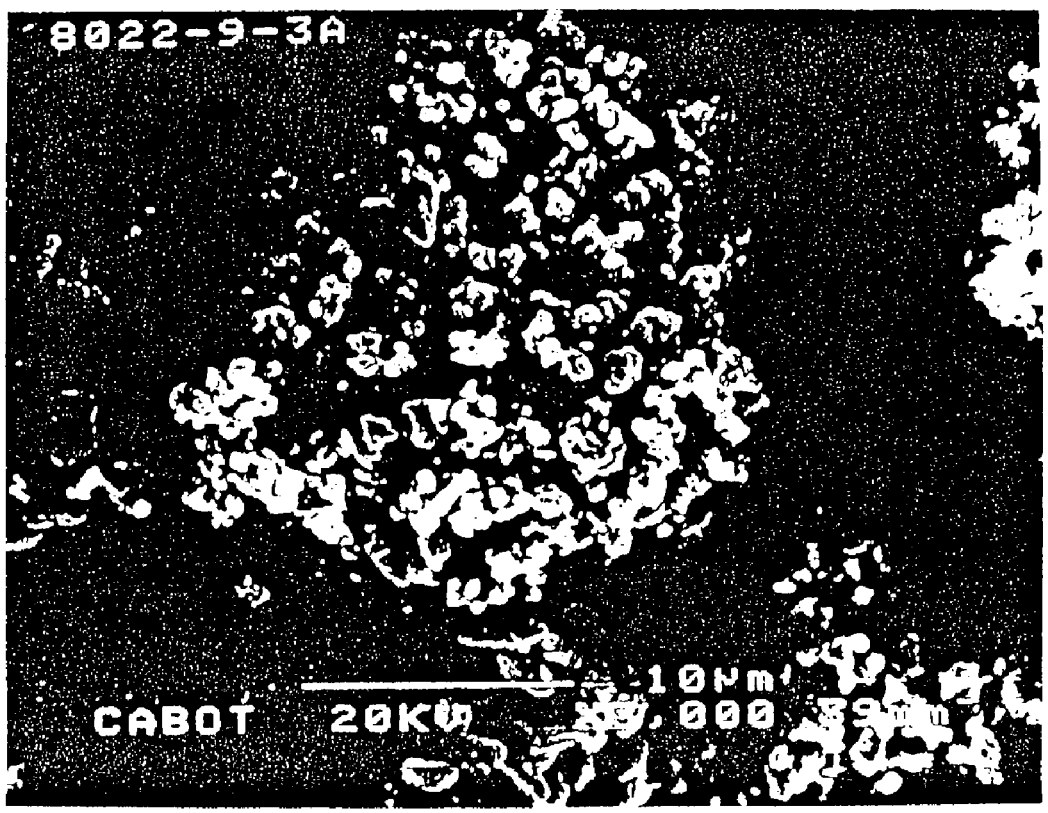
Figure 11:
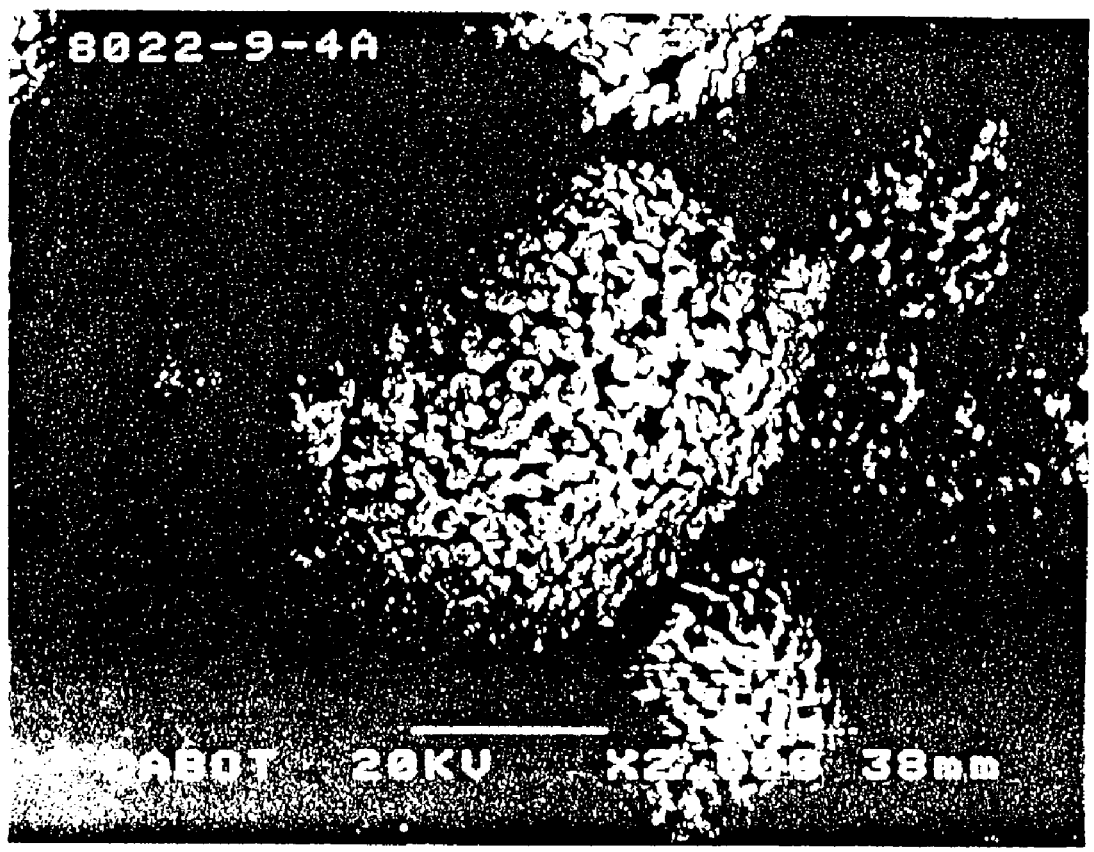

The Table shows the high capacitance and low DC leakage capability of anodes made from the pressed and sintered powders/pellets of the present invention. Microphotographs (SEMs) of various samples were taken. These photographs show the porous structure of the reduced oxygen niobium oxide of the present invention. In particular, FIG. 1 is a photograph of the outer surface of a pellet taken at 5,000× (sample 15). FIG. 2 is a photograph of the pellet interior of the same pellet taken at 5,000×. FIGS. 3 and 4 are photographs of the outer surface of the same pellet at 1,000×. FIG. 5 is a photograph of sample 11 at 2,000× and FIGS. 6 and 7 are photographs taken of sample 4 at 5,000×. FIG. 8 is a photograph taken of sample 3 at 2,000× and FIG. 9 is a photograph of sample 6 at 2,000×. Finally, FIG. 10 is a photograph of sample 6, taken at 3,000× and FIG. 11 is a photograph of sample 9 taken at 2,000×.

TABLE

| Sample | Input Material | Gms | Input Getter | Gms | Temp (°C.) | Time (min) | Hydrogen Pressure | XRD* Major 1** | XRD* Major 2** | XRD* Minor 1*** | XRD Minor 2*** | 1300X35v CV/g | 1300X35v na/CV |
|---|---|---|---|---|---|---|---|---|---|---|---|---|---|
| 1 | −40 mesh calcined $Nb_2O_5$ | 20 (est) | Ta hydride chips | 40 (est) | 1240 | 30 | 3 psi | | | | | 81297 | 5 |
| 2 | 60/100 $Nb_2O_5$ | 23.4 | Ta hydride chips | 65.4 | 1250 | 30 | 3 psi | $NbO_{1.1}$ | NbO | TaO | | 115379 | 1.28 |
| 3 | 60/100 $Nb_2O_5$ | 23.4 | Ta hydride chips | 65.4 | 1250 | 30 | 3 psi | $NbO_{1.1}$ | NbO | TaO | | 121293 | 2.19 |
| 4 | 100/325 $Nb_2O_5$ | 32.3 | Ta hydride chips | 92.8 | 1250 | 30 | 3 psi | | | | | 113067 | 1.02 |
| 5 | 100/325 $Nb_2O_5$ | 32.3 | Ta hydride chips | 92.8 | 1250 | 30 | 3 psi | | | | | 145589 | 1.42 |
| 6 | 60/100 $Nb_2O_5$ | 26.124 | Ta hydride chips | 72.349 | 1250 | 90 | 3 psi | | | | | 17793 | 12.86 |
| 7 | 60/100 $Nb_2O_5$ | 26.124 | Ta hydride chips | 72.349 | 1250 | 90 | 3 psi | | | | | 41525 | 5.63 |
| 8 | 200/325 $Nb_2O_5$ | 29.496 | Ta hydride chips | 83.415 | 1250 | 90 | 3 psi | | | | | 17790 | 16.77 |
| 9 | 60/100 $Nb_2O_5$ | 20.888 | Ta hydride chips | 60.767 | 1200 | 90 | 3 psi | $NbO_{1.1}$ | NbO | $Ta_2O_5$ | | 63257 | 5.17 |
| 10 | 60/100 $Nb_2O_5$ | 20.888 | Ta hydride chips | 60.767 | 1200 | 90 | 3 psi | $NbO_{1.1}$ | NbO | $Ta_2O_5$ | | 69881 | 5.5 |
| 11 | 200/325 $Nb_2O_5$ | 23.936 | Ta hydride chips | 69.266 | 1200 | 90 | 3 psi | $NbO_{1.1}$ | NbO | $Ta_2O_5$ | | 61716 | 6.65 |
| 12 | 200/325 $Nb_2O_5$ | 23.936 | Ta hydride chips | 69.266 | 1200 | 90 | 3 psi | $NbO_{1.1}$ | NbO | $Ta_2O_5$ | | 68245 | 6.84 |
| 13 | 200/325 $Nb_2O_5$ | 15.5 | 14/40 Ta hydride | 41.56 | 1250 | 30 | 3 psi | $NbO_{0.7}$ | NbO | TaO | $NbO_2$ | 76294 | 4.03 |
| 14 | 200/325 $Nb_2O_5$ | 10.25 | 14/40 Ta hydride | 68.96 | 1250 | 30 | 3 psi | $NbO_{0.7}$ | NbO | TaO | $NbO_2$ | 29281 | 21.03 |
| 15 | $Nb_2O_5$ pellets | 3.49 | 14/40 Ta hydride | 25.7 | 1250 | 30 | 3 psi | | | | | 70840 | 0.97 |
| 16 | 200/325 $Nb_2O_5$ | 13.2 | 14/40 Ta hydride | 85.7 | 1200 | 30 | 3 psi | $NbO_2$ | $NbO_{0.7}$ | TaO | NbO | 5520 | 34.33 |
| 17 | 200/325 $Nb_2O_5$ | 14.94 | 14/40 Ta hydride | 41.37 | 1200 | 30 | 3 psi | | | | | 6719 | 38.44 |
| 18 | 200/325 $Nb_2O_5$ | 11.92 | N200 Nb powder | 21.07 | 1200 | 30 | 3 psi | Nb | $NbO_{1.1}$ | NbO | | 25716 | 4.71 |
| 19 | 200/325 $Nb_2O_5$ | 10 | 14/40 Ta hydride | 69 | 1250 | 30 | 100 Torr | | | | | 108478 | 1.95 |
| 20 | 200/325 $Nb_2O_5$ | 16 | 14/40 Ta hydride | 41 | 1250 | 30 | 100 Torr | | | | | 106046 | 1.66 |

*X-Ray Defraction Analysis Results
**Major 1 and 2 refer to primary components present by weight.
***Minor 1 and 2 refer to secondary components present by weight.
Samples 11 and 12 had the same input material.
Samples 2 and 3 had the same input material.
Samples 6 and 7 had the same input material.
Samples 9 and 10 had the same input material.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method to at least partially reduce a calcined niobium oxide comprising heat treating of the calcined niobium oxide in the presence of a getter material and in an atmosphere which permits the transfer of oxygen atoms from the calcined niobium oxide to the getter material, for a sufficient time and temperature to form an oxygen reduced niobium oxide, wherein said calcined niobium oxide is a powder and said oxygen reduced niobium oxide is a powder, and wherein said oxygen reduced niobium oxide has a specific surface area of from about 1.0 $m^2/g$ to 10.0 $m^2/g$.

2. The method of claim 1, wherein the calcined niobium oxide is a calcined niobium pentoxide.

3. The method of claim 1, wherein the oxygen reduced niobium oxide has a micro-porous structure.

4. The method of claim 1, wherein the oxygen reduced niobium oxide has a pore volume of about 50%.

5. The method of claim 1, wherein the atmosphere is a hydrogen atmosphere.

6. The method of claim 5, wherein the hydrogen atmosphere is at a pressure of about 10 Torr to about 2000 Torr.

7. The method of claim 1, wherein the getter material is a niobium getter material, and wherein the niobium getter material is capable of a capacitance of at least 75,000 Cv/g when formed into an anode.

8. The method of claim 1, wherein said heat treating is at a temperature of from about 1100° C. to about 1500° C. and for about 10 to about 90 minutes.

9. The method of claim 1, wherein said getter material is homogenized with the calcined niobium oxide prior to or during the heat treating.

10. The method of claim 1, wherein said calcined niobium oxide is calcined $Nb_2O_5$ and said getter material is magnesium.

11. The method of claim 1, wherein said calcined niobium oxide is calcined $Nb_2O_5$, said getter material is magnesium, and said oxygen reduced niobium oxide has a niobium to oxygen atomic ratio of 1:less than 2.0.

12. The method of claim 1, wherein said calcined niobium oxide is calcined $Nb_2O_5$, said getter material is magnesium, and said oxygen reduced niobium oxide is NbO.

13. The method of claim 1, wherein said calcined niobium oxide is calcined $Nb_2O_5$ and said getter material is niobium.

14. The method of claim 1, wherein said calcined niobium oxide is calcined $Nb_2O_5$, said getter material is niobium, and said oxygen reduced niobium oxide has a niobium to oxygen ratio of 1 less than 2.0.

15. The method of claim 1, wherein said calcined niobium oxide is calcined $Nb_2O_5$, said getter material is niobium, and said oxygen reduced niobium oxide is NbO.

16. The method of claim 1, wherein said getter material is a niobium metal, and wherein said niobium metal has an iron, nickel, chromium, and carbon content below about 100 ppm.

17. The method of claim 1, wherein said getter material has a BET surface area of from about 5 to about 30 $m^2/g$.

18. The method of claim 1, wherein said calcined niobium oxide has particle sizes from about 150/250 to about 45/150 microns.

19. The method of claim 1, wherein said calcined niobium oxide has a particle size range of from about 45 microns to about 355 microns.

20. The method of claim 1, wherein said calcined niobium oxide has a particle size range of from about 150/250 to about 45/75 microns.

* * * * *

UNITED STATES PATENT AND TRADEMARK OFFICE
CERTIFICATE OF CORRECTION

PATENT NO.        : 7,445,762 B2                                    Page 1 of 1
APPLICATION NO.   : 10/436448
DATED             : November 4, 2008
INVENTOR(S)       : James A. Fife It is certified that error appears in the above-identified patent and that said Letters Patent is hereby corrected as shown below:

Title Pg, Item (60) "Related U.S. Application Data" please delete the following paragraph:

"Provisional application No. 60/100,629, filed on Sep. 19, 1998"

and insert in its place the following paragraph:

--Provisional application No. 60/100,629, filed on Sep. 16, 1998--

Signed and Sealed this

Twentieth Day of January, 2009

JON W. DUDAS
*Director of the United States Patent and Trademark Office*